United States Patent
Crenshaw et al.

(10) Patent No.: US 8,347,481 B1
(45) Date of Patent: Jan. 8, 2013

(54) WELDING BLANKET

(76) Inventors: Doyle J. Crenshaw, Booneville, AR (US); David L. Mixon, Amarillo, TX (US)

( * ) Notice: Subject to any disclaimer, the term of this patent is extended or adjusted under 35 U.S.C. 154(b) by 426 days.

(21) Appl. No.: 12/706,531

(22) Filed: Feb. 16, 2010

(51) Int. Cl.
  *B23P 11/00* (2006.01)
  *B23P 21/00* (2006.01)
  *B32B 3/06* (2006.01)

(52) U.S. Cl. .................. 29/525.14; 29/719; 428/101

(58) Field of Classification Search .............. 29/525.01, 29/744, 525.14, 719; 428/101, 102, 192, 428/900; 442/67
See application file for complete search history.

(56) References Cited

U.S. PATENT DOCUMENTS

| | | | |
|---|---|---|---|
| 3,034,140 A | 5/1962 | Reynolds | |
| 4,428,999 A * | 1/1984 | George et al. | 442/67 |
| 4,849,272 A | 7/1989 | Haney et al. | |
| 5,035,017 A | 7/1991 | Komuro | |
| 5,069,951 A | 12/1991 | Egan | |
| 5,503,891 A | 4/1996 | Marshall et al. | |
| 5,524,317 A | 6/1996 | Nagahama et al. | |
| 5,797,860 A | 8/1998 | Moriyasu | |
| D435,241 S | 12/2000 | Brantley | |
| 6,587,022 B1 | 7/2003 | Devine | |
| 7,125,595 B2 | 10/2006 | Kobayashi | |
| 2003/0180499 A1 | 9/2003 | Kobayashi et al. | |
| 2004/0006903 A1 | 1/2004 | Haytas | |
| 2008/0125290 A1 | 5/2008 | Cabados | |
| 2008/0164688 A1 | 7/2008 | Huff | |
| 2009/0179446 A1 | 7/2009 | Ahlers | |

OTHER PUBLICATIONS

Steiner Industries, "Web site printout" (5 pages), Dec. 4, 2009.

* cited by examiner

*Primary Examiner* — John C Hong
(74) *Attorney, Agent, or Firm* — Gable Gotwals

(57) ABSTRACT

This invention provides an improved protective mat that includes a magnet at each end for temporally securing the mat to a pipe so that the mat remains in position during a welding process. The mat is flexible so as to conform to the curvature of the pipe and may be placed in any position preferable on the surface of the pipe. The positioned and secured mat prevents spatter from coming into contact with the external surface of the pipe lying under the positioned protective mat. The mat is preferably heat and fire resistant up to temperatures of about 1500° F. and may be a silicone-coated fiberglass mat. When the mat is not in use, the mat may be folded and the magnets may be used to secure the ends of the mat to one another.

9 Claims, 2 Drawing Sheets

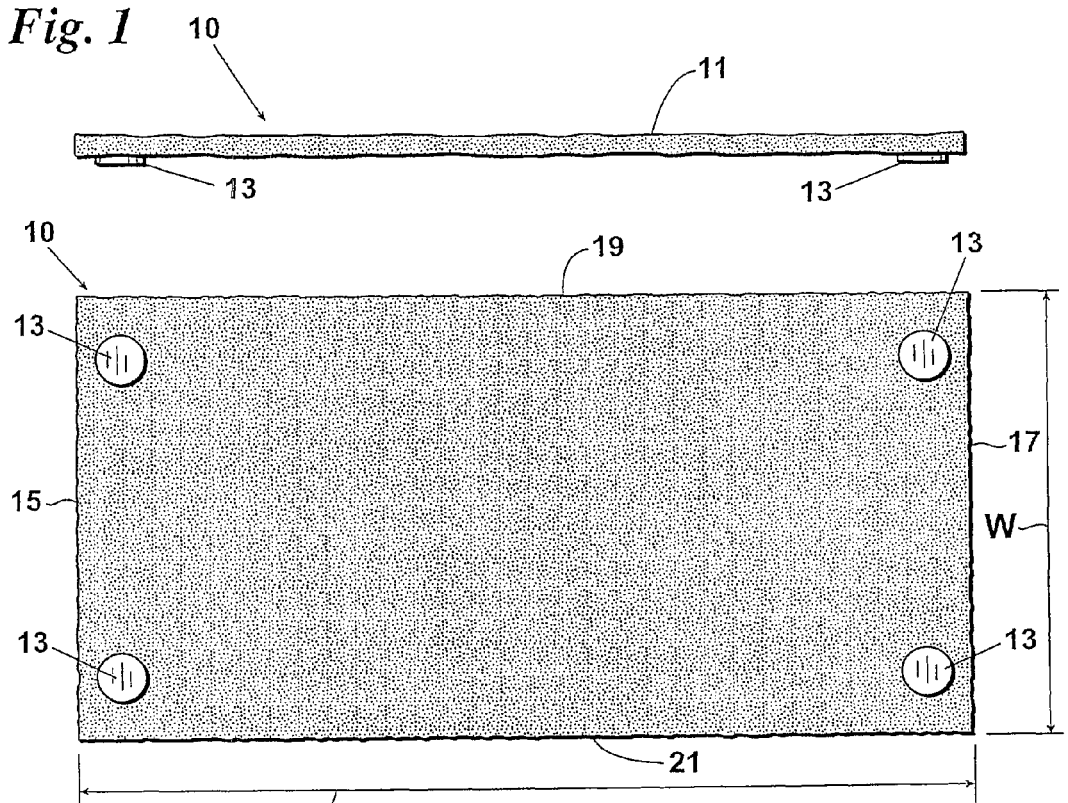
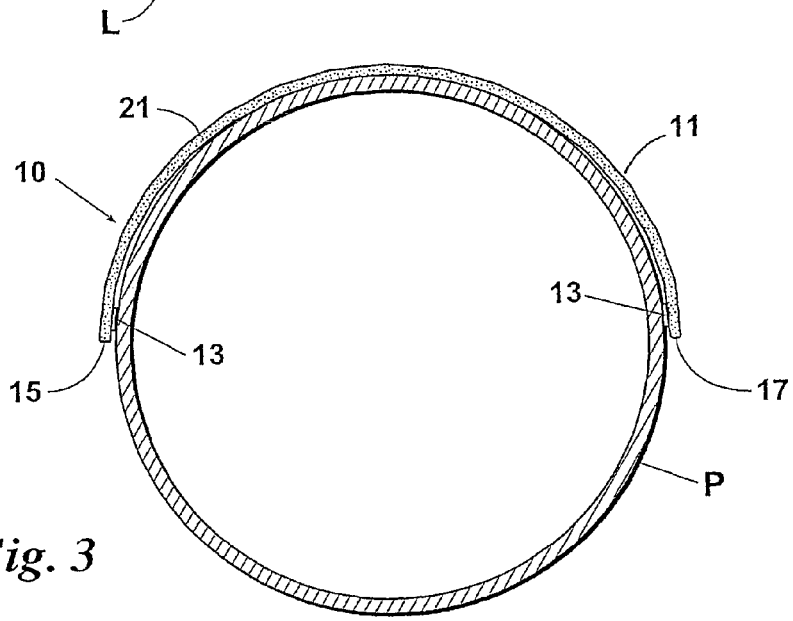

WELDING BLANKET

BACKGROUND OF INVENTION

This invention relates generally to the field of protective mats, covers or blankets and, more particularly, to the use of protective mats to protect the coating of a pipe during heating, grinding, welding, and brushing operations.

Fusion-bonded epoxy coating ("FBE coating") is a pipeline coating applied to a pipe prior to the pipe being delivered to the right of way for welding. To prevent the welding process from damaging the FBE coating, the coating stops short of each end of the pipe by about 2½ inches. However, at every weld made to join sections of pipe together, weld splatter or "spatter" tends to reach out a few inches farther than this 2½ inch buffer zone. The spatter melts into the FBE coating and damages it. If the coating is not repaired, the holes formed by the weld spatter in the coating makes that portion of the pipe subject to rust and deterioration.

Because of the damage to the coating caused by weld spatter, almost all pipeline operators require that the FBE coating be protected during the welding process, that is, during heating, grinding, welding, and brushing operations. Welders have tried various methods to protect the coating. These methods range from techniques aimed at reducing weld spatter to various coverings aimed at protecting the coating. An assortment of coverings have been tried, including cardboard, carpeting, wet rags, rubber bands or strips, auto floor mats, and specially designed welding blankets or mats. Each type of covering has its problems. Cardboard and carpeting do not always conform to the pipe's surface, they easily slip, blow, or get knocked off of the pipe, and they quickly burn up. Wet rags solve the conforming and slipping problem of cardboard and carpeting but may not be used due to welding codes and procedures. Rubber strips are allowed, and while they help solve the conforming and slippage problem of cardboard, they do little to solve the blowing off, knocking off, and burning up problem. Auto floor mats are not much different than the rubber strips. Welding mats do not easily burn up but, like these other materials, slip, blow, or get knocked off of the pipe.

SUMMARY OF THE INVENTION

This invention provides an improved welding blanket or protective mat that includes a magnet at each end for temporarily securing the mat to a pipe or pipeline so that the mat remains in position during a welding process. The mat is flexible so as to conform to the curvature of the pipe and may be placed in any position preferable on the surface of the pipe. When the mat is not in use, the mat may be folded and the magnets may be used to secure the ends of the mat to one another.

The protective mat is positioned over the external surface of the pipe so that a portion of the mat overlaps the uncoated end of the pipe. The mat is preferably dimensioned to drape over the top surface of the pipe and cover about one-half the circumference of the pipe. The mat is then secured to the pipe using the magnets. Alternatively, the mat may be held in place by affixing weights to each opposed end of the mat. The positioned and secured mat prevents spatter from coming into contact with the external surface of the pipe lying under the positioned protective mat. The mat is preferably heat and fire resistant up to temperatures of about 1500° F. and may be a silicone-coated fiberglass mat.

BRIEF DESCRIPTION OF THE DRAWINGS

FIG. 1 is an elevation view of a preferred embodiment of a protective mat made according to this invention. A fire- and heat-resistant fabric portion includes at least two magnets arranged at each end of the fabric portion. The magnets temporarily secure the protective mat to a pipe or pipeline so that heating, grinding, welding or brushing operations may occur without damage to the coating of the pipe.

FIG. 2 is a bottom view of the protective mat of FIG. 1. A pair of magnets is secured to the fabric portion at each end of the mat. When not in use, the protective mat may be folded in half and each pair of magnets may adhere to the opposing pair.

FIG. 3 is a view taken along section line 3-3 of FIG. 4. The protective mat of FIG. 1 is positioned onto the upper half of a pipe and temporarily secured to the pipe by the magnets.

DETAILED DESCRIPTION OF THE PREFERRED EMBODIMENTS

Figure 4:
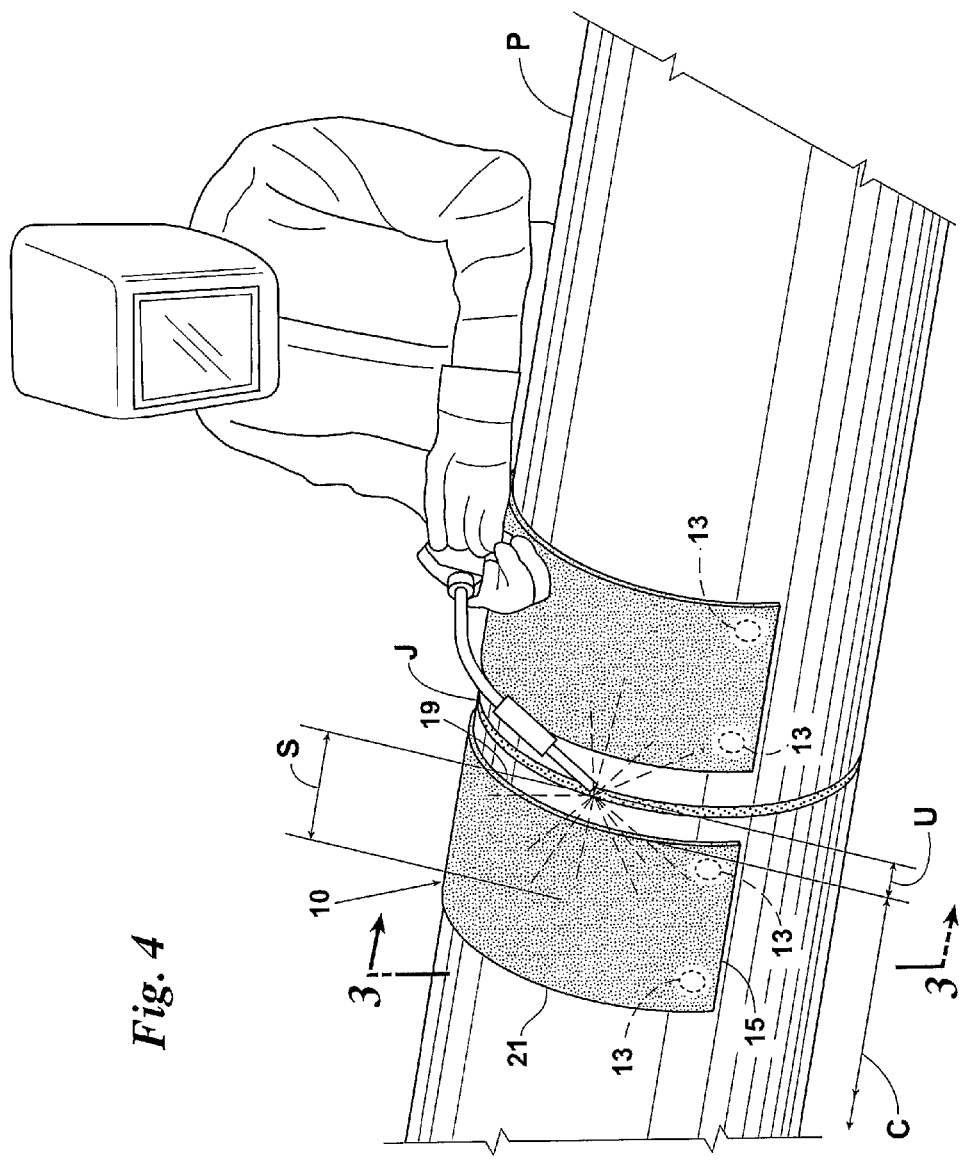
FIG. 4 is a view of a welder welding a pipeline seam or joint and using a pair of the protective mats of FIG. 1 to protect the exterior surface of the pipe from weld spatter. The mats overlap a portion of the uncoated end of the pipe and have sufficient width and length to protect the coated portions located nearest to the weld from spatter.

Preferred embodiments of an improved protective mat for use on pipes and pipelines during heating, grinding, welding or brushing operations will now be described by making reference to the drawings elements illustrated in the drawings. Referring first to FIGS. 1 & 2, a protective mat 10 made according to this invention includes a rectangular-shaped, heat- and fire-resistant fabric portion 11 that includes a pair of magnets 13 affixed at each end 15, 17 of the fabric portion 11. Magnets 13 may be sized to have sufficient weight to hold protective mat 10 in place without the need for magnetic attachment. Fabric portion 11 is preferably resistant to heat and fire up to temperatures of about 1500° F. A suitable material for fabric portion 11 is silicone-coated fiberglass (Steiner Industries, Chicago, Ill.). Magnets 13 may be any size or shape and are preferably arranged so that the magnets 13 located at end 15 may be secured to magnets 13 located at ends 15, 17 when mat 10 is not in use. In one embodiment, only a single magnet 13 is required at each end 15, 17

Turning now to FIGS. 2 to 4, protective mat 10 is temporarily secured by magnets 13 about an external surface of a pipe P. Once attracted to the pipe P, the magnets 13 prevent mat 10 from slipping off of the pipe, being blown off of the pipe, or being knocked off of the pipe by an operator or equipment. Mat 10 is flexible to conform to the curvature of pipe P and preferably has sufficient length L to cover about a 180° arc of the pipe. For example, if pipe P is a 6-inch pipe, then L is about 9½ inches (roughly half the circumference of the pipe); if pipe P is a 24-inch diameter pipe, then L is about 38 inches. If the length L of mat 10 is shorter than that desired, two or more mats 10 may be placed end-to-end and secured by magnets 13 to the pipe P to obtain the desired coverage. Further, when the welder changes welding rods, he can slide the mat down. Mat 10 is typically placed on the upper half of pipe P because weld spatter tends to fall away from the lower half of the pipe P. However, because of magnets 13, protective mat 10 can be placed in any position preferable.

In applications in which fusion bonded epoxy coated pipe (or other types of coated pipe) is being worked on, a pair of protective mats 10 are used. Each mat 10 is placed on opposing sides of a seam or joint J that is being heated, ground, welded or brushed. Mat 10 is positioned so that the side 19 of the mat 10 located nearest to joint J overlaps the uncoated area U of pipe P. Typically this uncoated area extends about 2½ inches from the end of the pipe. Mat 10 preferably has sufficient width W to place the side 21 located farthest from joint J a sufficient distance past the spatter zone S and protect the coated area C lying under the spatter zone S from damage. If the width W of mat 10 is narrower than that desired, two or more mats 10 may be placed side-by-side and secured by magnets 13 to the pipe P to obtain the desired coverage.

Each drawing shows two magnets at each end of the mat. In practice, one magnet at each end of the mat may be sufficient, depending on the width of the mat.

While an improved protective mat and method for its use have been described with a certain degree of particularity, many changes may be made in the details of construction and the arrangement of components without departing from the spirit and scope of this disclosure. A system and method according to this disclosure, therefore, is limited only by the scope of the attached claims, including the full range of equivalency to which each element thereof is entitled.

What is claimed is:

1. A system for protecting a surface of a metallic structure from spatter during a welding operation, the system comprising
   - a first and a second blanket, each said blanket having a fabric portion that is heat- and fire-resistant;
   - at least two magnets in communication with each said blanket, said at least two magnets arranged to secure opposing ends of the blanket to an external surface of a metallic structure wherein the first and second blankets when secured to the metallic structure are spaced apart one from the other to provide an uncovered external surface of the metallic structure between said blankets.

2. A system according to claim 1 wherein the fabric portion is fire and heat resistant up to a temperature of about 1500° F.

3. A system according to claim 1 wherein the metallic structure is a tubular member.

4. A system according to claim 3 wherein said fabric portion when temporarily secured to the tubular member covers at least a 90° arc of the tubular member.

5. A system according to claim 1 further comprising a portion of said at least two magnets being housed within an interior space of said fabric portion.

6. A system according to claim 1 further comprising said fabric portion being a silicone-coated fiberglass fabric portion.

7. A method for protecting metallic tubular member from spatter during welding operations, the method comprising the steps of:
   - positioning a first and a second protective mat over an external surface of the tubular member, each said protective mat being positioned at a predetermined distance from an end of the tubular member;
   - securing each said positioned protective mat to the tubular member using at least two magnets arranged opposite one another;
   - wherein each said positioned protective mat prevents spatter from welding from coming into contact with the external surface lying under the positioned protective mat.

8. A method according to claim 7 wherein each said protective mat includes the at least two magnets.

9. A method according to claim 7 wherein each said protective mat includes a flexible heat- and fire-resistant fabric portion.

* * * * *